UNITED STATES PATENT OFFICE.

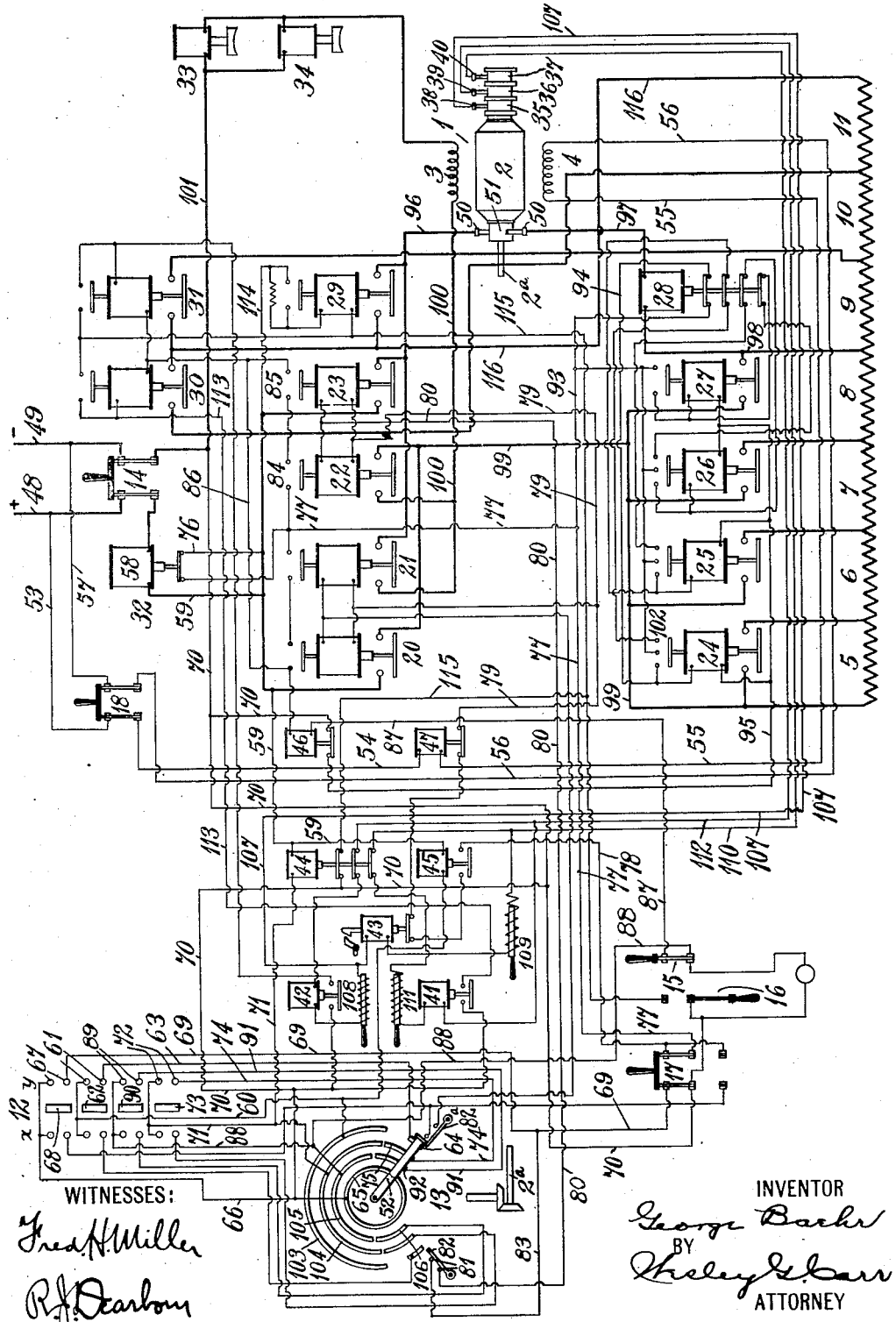

GEORGE BAEHR, OF MONTCLAIR, NEW JERSEY, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,056,879.      Specification of Letters Patent.      Patented Mar. 25, 1913.

Application filed December 29, 1909. Serial No. 535,400.

*To all whom it may concern:*

Be it known that I, GEORGE BAEHR, a citizen of the United States, and a resident of Montclair, in the county of Essex and State of New Jersey, have invented a new and useful Improvement in Systems of Electric-Motor Control, of which the following is a specification.

My invention relates to control systems for electric motors and it has special reference to such control systems as are particularly adapted for skip-hoist or elevator motors.

The object of my invention is to provide a system of the class above indicated that shall embody means for automatically bringing the motor to rest at predetermined points in its operation in either direction and means dependent upon the motor load for so governing the application of the brakes as to secure equal and uniform retardation, irrespective of the motor load.

In blast furnace skip hoist control systems, there are usually three different loads to be taken into consideration, as follows: first, when the skip cars are filled with ore; second, when the skip cars are filled with coke; third, when the skip cars are empty. It is particularly desirable for this service to maintain a uniform speed for the cars at a predetermined distance from the limit of travel or stopping point, irrespective of the loads which they are carrying. In order to secure this result, the retardation of the operating motor must be substantially uniform, irrespective of the motor load. In other words the motor must always be brought to rest in equal retardation periods.

According to my present invention, I provide a system of electric motor control which may be utilized for various purposes but which is specially designed to meet the requirements for automatically operating skip hoists for blast furnaces. In retarding the electric motor at predetermined limits in its operation, I employ a re-generative braking arrangement and I automatically vary the amount of resistance included in the re-generative circuit according to the motor speed, which varies to a certain extent with the motor load.

The single figure of the accompanying drawing is a diagrammatic view showing the circuit connections of a system of control embodying my invention.

Referring to the drawing, the system here shown comprises an electric motor 1, having an armature 2, a series field magnet winding 3 and a shunt field magnet winding 4; a resistance comprising a plurality of sections 5 to 11 inclusive, a master switch 12, a limit switch 13, manually operated switches 14, 15, 16, 17 and 18, electrically operated reversing switches 20, 21, 22 and 23, accelerating switches 24, 25, 26 and 27, a series relay switch 28, re-generative brake switches 29, 30 and 31, an overload circuit breaker 32, brake magnets 33 and 34 and a plurality of relay switches 41, 42, 43, 44, 45, 46 and 47.

Direct current energy is supplied from any suitable source through circuit conductors 48 and 49 to brushes 50 of the motor 1 and the control circuits of the system are supplied with energy from the same source, with the exception of the relay switches 41, 42 and 43 which are supplied with energy from alternating current collector rings 35, 36 and 37 with which the armature 2 of the motor 1 is provided. The collector rings are connected to suitable points in the armature winding and are engaged by stationary contact brushes 38, 39 and 40.

The magnet windings of the relay switches 41, 42 and 43 are so designed that the alternating current voltage, generated in the motor armature, under maximum load, will not actuate any of them but, under medium load on the motor 1 the relay 41 will be actuated, and under minimum load conditions relay switches 41 and 42 will both be actuated. Under normal operating conditions, relay switch 43 will not be actuated at all, its design being such that, should the motor speed exceed a predetermined amount (preferably 10% above normal) it will be actuated and will interrupt the motor circuits as hereinafter pointed out. The relay switches 41 and 42 serve to short-circuit sections of the re-generative brake resistance so that the re-generative braking action shall be a maximum when the load is a minimum, and vice versa.

The operation of and the circuit connections for the system are as follows: Assuming that the switches occupy the positions shown in the drawing and that the motor has been brought to rest by the limit switch 13 at one extremity of its travel, as indicated by the position of the contact arm 52 of the limit switch 13; if the master controller 12 is moved to occupy the position y, circuit connections are established as follows: A shunt field circuit is established from the positive line conductor 48, through conductor 53, switch 18, conductor 54, magnet coil 47, conductor 55, shunt field magnet winding 4, conductor 56, switch 18 and conductor 57 to the negative line conductor 49. The completion of this circuit closes the relay switch 47. A circuit is completed through the magnet winding of relay 45, from conductor 48, through main line switch 14, series coil 58 of the circuit breaker 32, conductor 59, winding 45, conductor 60, contact fingers 61 (which are bridged by the contact member 62), conductor 63, contact members 64 and 65 (which are bridged by the arm 52), conductor 66, contact fingers 67 (which are bridged by the contact member 68), conductor 69 and switch 17 to the negative conductor 70 which is connected directly through the switch 14 to the negative line conductor 49. A circuit for the relay magnet winding 44 is completed from conductor 59 through said magnet winding, conductor 71, fingers 72 (which are bridged by the contact member 73), conductor 74 to contact members 75 and 65 (which are bridged by the arm 52) from which point the circuit is completed as above indicated. The relay switches 44 and 45 will thus be actuated, the former being open, when energized, and the latter closed. The closure of the relay switch 45 completes a control circuit for the motor reverse switches 22 and 23 from conductor 59, through conductor 76, circuit breaker 32, conductor 77, switch 17, conductor 78, relay switches 45, 43 and 47, conductor 79, magnet coils of switches 22 and 23, conductor 80, fingers 81 (which are bridged by the contact member 82, except when the limit switch 13 occupies its opposite extreme position), conductor 83 and conductor 69 to the negative conductor 70. As soon as reversing switches 22 and 23 are closed, a motor circuit is established from conductor 59, through reversing switch 23, conductor 96, commutator 51 of the motor 1, conductor 97, magnet winding of relay switch 28, conductor 98, resistance sections 8, 7, 6 and 5, conductor 99, motor reversing switch 22, conductor 100, series field magnet winding 3, brake magnets 33 and 34, conductor 101 and switch 14 to the negative conductor 49. The motor circuit having been completed with suitable resistance in series relation with the armature, the motor will be started and the series relay switch 28 will be temporarily energized.

When the motor reverse switches 22 and 23 are closed, the relay switches 84 and 85 with which they are provided are also closed and a control circuit is then completed from conductor 77, through said relay switches, conductor 86, magnet winding of relay 46, conductor 87, switch 15, conductor 88, contact fingers 89 (which are bridged by the contact member 90), conductor 91 to contact member 92 of the limit switch, the circuit being completed from this point through the arm 52 and the contact member 65 as above indicated. The relay switch 46 which controls the accelerating switches 24, 25, 26 and 27 is thus closed and a control circuit is established from conductor 77, through conductor 93, relay switch 28, conductor 94, magnet winding of the accelerating switch 24, conductor 95 and relay switch 46 to the negative conductor 70. The accelerating switch 24 is thus energized as soon as the series relay is closed and short-circuits the resistance section 5. When the accelerating switch 24 closes, a relay switch 102, with which it is provided, is also closed and a control circuit is then completed through its magnet winding independently of the relay switch 28, in a well known manner, another control circuit through the relay switch being completed through the magnet winding of the accelerating switch 25. This action is repeated and the accelerating switches are successively actuated to short-circuit the resistance sections 5, 6, 7 and 8, the accelerating action being delayed by the series relay in order to prevent injury to the motor armature.

The limit switch 13 is mechanically connected to the shaft 2ᵃ of the motor 1, either directly or indirectly, by gearing or otherwise so that the arm 52 rotates in a counter-clockwise direction and successively engages the contact ring segments 103, 104 and 105. As soon as the arm 52 moves out of its extreme position, the switch 82ᵃ, which corresponds to the switch 82, is permitted to close, and, when the arm engages the segment 103, the control circuit through the magnet winding of the relay 45 is completed from conductor 60 directly to conductor 66 through the arm 52, making this circuit independent of the master switch 12. When the arm engages the contact ring segments 104 and 105, relay switches 44 and 46 are also independent of the master switch. It is evident, therefore, that it is only necessary to move the master switch to the position y for a very short time, after which it may be returned to its "off" position, the operation of the system being automatic thereafter. The mechanical structure of the master switch is preferably such that as soon as its operating lever is released by the attendant, it will automatically return to its "off" position. It will be readily understood by those skilled in the art that the speed ratio between the shaft of the motor 1 and the contact arm 52 of the limit switch may be such that the operation of the motor may continue to any predetermined point in its travel before it is automatically brought to rest. When the contact arm approaches the opposite extremity of its travel from that which is indicated in the drawing, it first moves out of engagement with the contact ring segment 105 and into engagement with the segment 106. In becoming disengaged from the segment 105, the circuit which was completed from the relay 46 is interrupted (the master switch being in its "off" position). It follows that the relay switch opens and the accelerating switches 24, 25, 26 and 27 are also opened and the motor armature resistance is reinserted. This is the first step in retarding the speed of the motor. The contact arm 52 is next disengaged from the ring segment 104, thereby interrupting the circuit of the relay 44 and permitting this switch to close.

When the relay switch 44 is closed, the magnet windings of the relay switches 41 and 42 are energized from the alternating circuits which are supplied with energy from the brushes 38, 39 and 40. The circuits may be traced as follows: from the contact brush 38, through conductor 107 to one terminal of the magnet winding of the relay switch 42, through the inductive resistance 108 and directly to one terminal of the magnet winding of the switch 43. The opposite terminal of the switch 43 is connected through the inductive resistance 109 and conductor 110 to contact brush 39. The contact brush 39 is also connected through one section of the relay switch 44 and through inductive resistance 111 to one terminal of the relay switch magnet 41, the opposite terminal of this magnet being connected through conductor 112 to contact brush 40. The brush 39 is also connected to the opposite terminal of the magnet 42 through a section of the switch 44. If it is assumed that the ring segments 35, 36 and 37 are connected to three equally spaced points in the motor armature winding, the voltage between any two of the conductors 107, 110 and 112 will be equal, as in any three-phase alternating current circuit, and it is evident from the circuit connections above traced that the magnet windings of the relays 41, 42 and 43 are energized by being connected to different legs of this three-phase circuit. The voltage applied to the relay magnets will, of course, depend upon the speed of the motor, and, since the speed ordinarily varies with the motor load, the voltage applied to the coils will be dependent upon the motor load. The magnets themselves are so designed, as already pointed out, that all of the relays will be actuated only when the motor speed exceeds a predetermined amount, for example, 10% above normal; the relay switches 41 and 42 will be actuated under minimum load conditions; only the switch 41 under medium load conditions, and none of them will be actuated under full load conditions.

If it is first assumed that the motor speed is excessive so that the relay switch 43 is actuated, it is evident, from the circuit connections already traced, that the motor reversing switches will be opened and, since this relay switch is independent of the switch 44, the motor circuit may be interrupted at any time, if its speed is abnormally high. If it is assumed that the motor is operated under minimum load, both the relay switches 41 and 42 will be closed and circuits will be established as follows: from conductor 77, through relay switches 84 and 85 to the magnet windings of the switches 30 and 31. From magnet winding 30, circuit is completed through a conductor 113 and relay switch 41 to negative conductor 70. From the winding of the switch 31, a circuit is similarly completed through the relay 42. Therefore, under the conditions above assumed, both the switches 30 and 31 will be closed. When the relay switch 44 was first deënergized and closed by reason of the disengagement of the arm 52 from the segment 104, a circuit was completed from conductor 59, through conductor 114, magnet winding of switch 29, conductor 115 and one section of relay switch 44 to negative conductor 70 through switch 17, the switch 29 being consequently closed. A circuit is established, as soon as the switch 29 is closed, from the commutator brush 50 of the motor 1, through conductor 96, switch 29, conductor 116, resistance sections 11, 10 and 9, conductors 98 and 97 to the opposite commutator brush. The motor will operate as a generator by reason of its momentum and will, therefore, supply energy to the resistance sections 9, 10 and 11. The braking effect of this connection upon the motor is well known and its intensity is dependent upon the amount of resistance included in the amature circuit. If both the switches 30 and 31 are closed in addition to the switch 29, as in one of the cases assumed when there is a minimum load, only the resistance section 9 will be connected in the local circuit so that the intensity of the braking effect will be increased. If only the switches 29 and 30 are closed, the arrangement of the resistance is such that the braking effect will be less in intensity than when both are closed, but greater in intensity than when neither of them is closed. The contact arm 52 and the ring segment 103 are so arranged that the former will be separated from the latter at the same time that the arm is separated from the segment 104, and, consequently, the circuit which was established from the magnet winding of the relay 45 will be interrupted at the same time that the magnet circuit for the relay 44 is interrupted, and the relay 45 will open just before the relay 44 is closed. The opening of the relay 45 deënergizes the motor switches and interrupts the motor circuit.

I claim as my invention:

1. In a control system, the combination with an electric motor, a supply circuit therefor, and limiting means for automatically interrupting the supply circuit at a predetermined point in its travel, of retarding means dependent upon the speed of the motor at the time the motor circuit is interrupted for bringing the motor to rest in substantially equal retardation periods.

2. In a control system, the combination with an electric motor, means for accelerating the motor and limiting means for bringing the motor to rest at a predetermined point in its operation, of means for utilizing the momentum of the motor at the time its circuit is interrupted for bringing the motor to rest, and means dependent upon the motor speed at the time the supply circuit is interrupted, for varying the degree of braking.

3. In a control system, the combination with an electric motor, means for accelerating the motor and limiting means for bringing the motor to rest at a predetermined point in its operation, of means for short-circuiting the motor armature through an external resistance upon the interruption of the motor circuit and means dependent upon the motor speed at the time its supply circuit is interrupted for determining the value of the resistance included in said shunt circuit.

4. In a control system, the combination with an electric motor, means for accelerating the motor and limiting means for interrupting the motor circuit at a predetermined point in its operation, of means dependent upon the interruption of the motor circuit for short-circuiting the armature through an external resistance, and means dependent upon the alternating current voltages generated in the armature winding at the time the circuit is interrupted for varying the amount of said external resistance.

5. In a system of control, the combination with a direct current electric motor having alternating current collector rings and external circuit connections and direct current supply circuits, and switches for short-circuiting the motor armature through an external resistance, of means dependent upon the voltage of the alternating current circuits for automatically determining the amount of resistance included in the short-circuit.

6. In a control system, the combination with an electric motor, a supply circuit therefor, a master switch for determining the direction of the motor rotation and an automatic limiting switch for bringing the motor to rest at predetermined point in its operation in either direction, of controlling means dependent upon the interruption of the motor circuit for short-circuiting the motor armature through an external resistance, and a plurality of relay switches dependent upon the electro-motive forces generated in the motor armature winding for varying the amount of said external resistance, whereby the retardations of the motor may be uniform and independent of the motor load.

7. In a control system, the combination with a direct current electric motor having external means for utilizing the alternating current electro-motive forces generated in the motor armature and means for interrupting the motor supply circuit and for short circuiting the motor armature through an external resistance, of means governed by the alternating current electro-motive forces generated in the motor armature for controlling the amount of external resistance included in the aforesaid short circuit.

In testimony whereof, I have hereunto subscribed my name this 18th day of December. 1909.

GEORGE BAEHR.

Witnesses:
 JOHN FOX,
 DAVID J. MAHONE.